United States Patent
Ponziani et al.

[11] Patent Number: 5,167,484
[45] Date of Patent: Dec. 1, 1992

[54] METHOD FOR THRUST BALANCING AND FRAME HEATING

[75] Inventors: Robert L. Ponziani, Cincinnati; William F. McGreehan, West Chester; Neil Howes, Cincinnati, all of Ohio

[73] Assignee: General Electric Company, Cincinnati, Ohio

[21] Appl. No.: 856,277

[22] Filed: Mar. 23, 1992

Related U.S. Application Data

[62] Division of Ser. No. 590,730, Oct. 1, 1990.

[51] Int. Cl.$^5$ ............................... F02C 7/00
[52] U.S. Cl. ........................... 415/1; 415/104
[58] Field of Search .......... 60/39.02, 39.161, 39.31, 60/39.75; 415/1, 104, 105, 106, 107

[56] References Cited

U.S. PATENT DOCUMENTS

| | | | |
|---|---|---|---|
| 2,410,769 | 11/1946 | Baumann | 415/104 |
| 2,530,477 | 11/1950 | Ostmar | 415/104 |
| 2,647,684 | 8/1953 | Lombard | 415/104 |
| 2,746,671 | 5/1956 | Newcomb | 415/104 |
| 2,919,104 | 12/1959 | Blyth | 415/107 |
| 2,966,296 | 12/1960 | Morley et al. | 415/105 |
| 3,452,542 | 7/1969 | Saferstein et al. | 60/39.75 |
| 4,306,834 | 12/1981 | Lee | 415/116 |
| 4,615,657 | 10/1986 | Kreitmeier | 415/104 |
| 4,697,981 | 10/1987 | Brown et al. | 415/104 |
| 4,864,810 | 9/1989 | Hines | 415/105 |

Primary Examiner—Louis J. Casaregola
Attorney, Agent, or Firm—Jerome C. Squillaro; James P. Davidson

[57] ABSTRACT

An industrial gas turbine engine includes in serial flow relationship a first compressor, a second compressor, a combustor, a first turbine, and a second turbine. The first compressor and the second turbine are fixedly joined together by a first shaft, and a turbine rear frame having a hub is disposed downstream of the second turbine for rotatably supporting the first shaft. A balance piston is fixedly joined to the first shaft, and means for channeling a fluid first to the balance piston for balancing thrust force on the first shaft and then to the turbine rear frame for heating the hub are provided. The apparatus is effective for carrying out a method including channeling a fluid first to the balance piston for thrust balancing the first shaft and then channeling the fluid to the tubine rear frame for heating the frame hub.

4 Claims, 5 Drawing Sheets

METHOD FOR THRUST BALANCING AND FRAME HEATING

This application is a division of application Ser. No. 07/590,730, filed Oct. 1, 1990.

TECHNICAL FIELD

The present invention relates generally to gas turbine engines, and, more specifically, to aircraft gas turbine engines adapted for land-based and marine applications.

BACKGROUND ART

Marine and land-based industrial (M&I) gas turbine engines are frequently derived from engines designed for and used in various types of aircraft. Such M&I gas turbine engines are used, for example, for powering marine vessels, electrical generators, and various types of pumps and compressors.

One type of gas turbine engine used for powering an electrical generator for providing electricity to a utility electrical power grid includes two rotors. More specifically, the engine includes in serial flow relationship a conventional booster compressor, core engine, and power turbine having an output shaft connectable to the electrical generator. A power turbine includes a first shaft joined to the booster compressor, and the core engine includes a conventional high pressure compressor (HPC) joined to a conventional high pressure turbine (HPT) by a second shaft. The first and second shafts rotate independently of each other but are predeterminedly controlled for conventionally matching fluid flowrates between booster compressor and the core engine, for example. Such an industrial gas turbine engine may be conventionally derived from an aircraft gas turbine engine by eliminating the conventional fan disposed upstream of the booster compressor in the aircraft gas turbine engine, and modifying the booster compressor, for example by modifying the first few rotor stages thereof as is conventionally known for use in powering an electrical generator. Downstream of the power turbine, a conventional industrial exhaust assembly is provided for discharging the combustion gases from the power turbine to the atmosphere.

The parent aircraft engine is initially designed for axially balancing aerodynamic forces transmitted through the first shaft. During operation, the fan generates a propulsion force for powering the aircraft, which force is an axially forwardly directed force. The booster compressor also provides a component of an axially forwardly directed force since it is compressing airflow, and thereby increasing its pressure at its downstream end thereof. The power turbine connected to the first shaft extracts energy from the combustion gases and thereby decreases the pressure thereof which results in an aft directed axial force which is opposite to the forces generated by the fan and the booster compressor. The net axial force from the components is typically a relatively small value which is conventionally accommodated by a thrust bearing on the first shaft.

However, when the fan is eliminated from the engine for developing the M&I engine without modifying the power turbine, the axial component of force from the fan is also eliminated which will result in a substantial axial force unbalance in the first shaft unless suitable means are provided for balancing the remaining axial force. Conventional balance pistons are known in the art which provide an area over which a relatively high pressure is applied for generating an axial balance force for thrust balancing in lieu of the removed fan.

The gas turbine engine also includes a hot structural frame, such as, for example, the turbine rear frame disposed downstream of the power turbine for supporting the first shaft, for example. The turbine rear frame conventionally includes a plurality of circumferentially spaced struts between which the combustion gases from the power turbine are channeled, and a radially inner hollow hub from which the first shaft is rotatably supported by a conventional bearing. During operation of the engine, the struts are subject to the relatively hot combustion gases and therefore are heated and expand relatively quickly. The hub, in contrast, is disposed radially inwardly of the struts and is not in direct flow communication with the combustion gases and therefore is not heated as quickly nor expands as quickly as the struts. This temperature differential between the struts and the hub results in the generation of thermally induced stress which affects the low cycle fatigue life of the frame.

One conventional means for reducing these temperature differentials in the rear frame includes bleeding a portion of the hot combustion gases directly from the main flowstream, through the struts, and into the hub. However, the temperature, pressure, and flowrate of the bleed combustion gases decreases the performance of the engine and the effectiveness of the hub heating.

The prior art includes various arrangements for rotor thrust balancing, and for heating and cooling of engine components for reducing thermal stress. The various arrangements are at various levels of complexity and effectiveness and are independent of each other.

OBJECTS OF THE INVENTION

Accordingly, one object of the present invention is to provide a now and improved gas turbine engine for marine and industrial applications.

Another object of the present invention is to provide a gas turbine engine derived from an aircraft gas turbine engine requiring relatively few changes for powering an electrical generator.

Another object of the present invention is to provide a gas turbine engine and method for thrust balancing and frame heating.

Another object of the present invention is to provide a gas turbine engine combining thrust balancing and frame heating for obtaining relatively simple and efficient use of a balancing and heating fluid.

Another object of the present invention is to provide a gas turbine engine having an improved means for heating a turbine frame.

Another object of the present invention is to provide a gas turbine engine having a turbine frame provided with a heating fluid at relatively high velocity and turbulence for increasing heat transfer into the frame hub.

DISCLOSURE OF INVENTION

An industrial gas turbine engine includes in serial flow communication a first compressor, a second compressor, a combustor, a first turbine, and a second turbine. The first compressor and the second turbine are fixedly joined together by a first shaft, and a turbine rear frame having a hub is disposed downstream of the second turbine for rotatably supporting the first shaft. A balance piston is fixedly joined to the first shaft, and means for channeling a fluid first to the balance piston for balancing thrust force on the first shaft and then to the turbine rear frame for heating the hub are provided. The apparatus is effective for carrying out a method including channeling a fluid first to the balance piston for thrust balancing the first shaft and then channeling the fluid to the turbine rear frame for heating the frame hub.

BRIEF DESCRIPTION OF DRAWINGS

The novel features believed characteristic of the invention are set forth and differentiated in the claims. The invention, in accordance with preferred and exemplary embodiments, together with further object and advantages thereof, is more particularly described in the following detailed description taken in conjunction with the accompanying drawing in which:

MODE(S) FOR CARRYING OUT THE INVENTION

Figure 1:
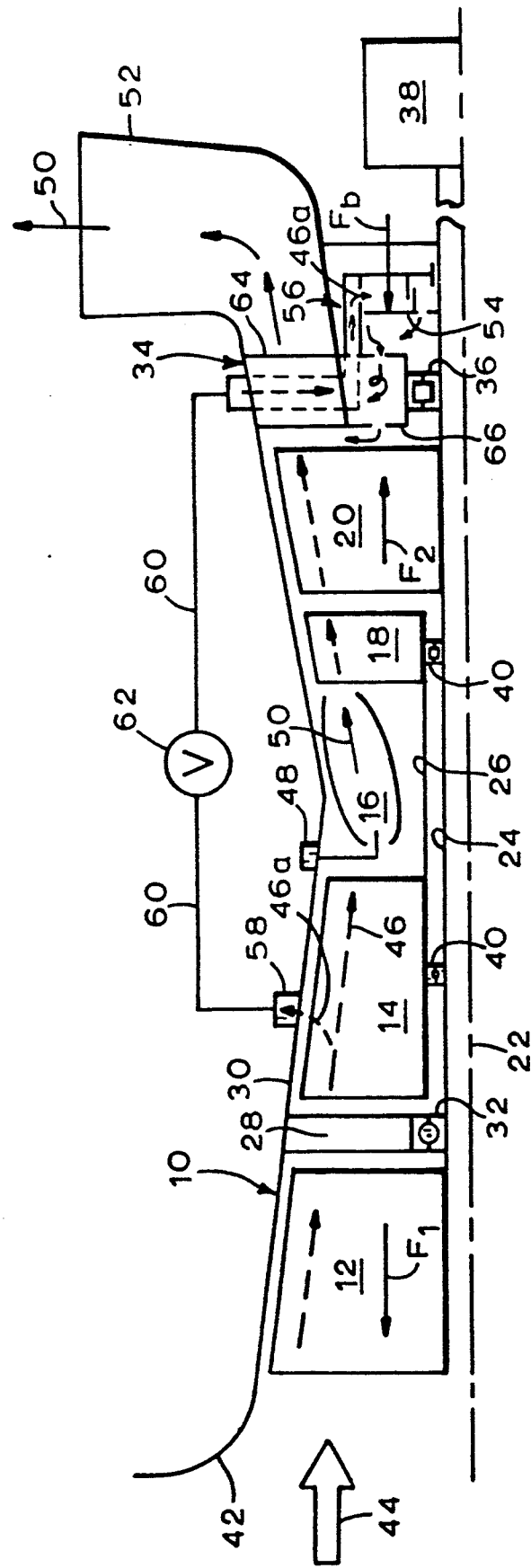
FIG. 1 is a longitudinal, centerline, sectional schematic representation of an industrial gas turbine engine in accordance with one embodiment of the present invention.

Illustrated in FIG. 1 is an exemplary gas turbine engine 10, the majority of which being originally designed for powering an aircraft in flight (not shown). Although the engine 10 is an aircraft-derived engine, originally designed engines may also be used. The engine 10 includes in serial flow communication a conventional first, or booster, compressor 12, a second, or high pressure, compressor (HPC) 14, a combustor 16, a first, or high pressure, turbine (HPT) 18, a second, or low pressure power turbine (LPT) 20, all disposed coaxially about a longitudinal, axial centerline axis 22. The booster compressor 12 and the LPT 20 are fixedly joined together by a conventional first, or low pressure (LP), shaft 24, and the HPC 14 and the HPT 18 are fixedly joined together by a conventional second, or high pressure (HP), shaft 26.

A conventional stationary front frame 28 extends radially inwardly from an outer casing 30 between the booster compressor 12 and the HPC 14 for supporting a forward end of the LP shaft 24 by a conventional thrust bearing 32. A stationary turbine rear frame (TRF) 34 in accordance with one embodiment of the present invention is disposed downstream of the LPT 20 and extends radially inwardly from the outer casing 30 for rotatably supporting an intermediate portion of the LP shaft 24 by a conventional bearing 36. The LP shaft 24 extends rearwardly and is suitably conventionally joined to a conventional electrical generator 38 for providing electrical power to an electrical power grid (not shown). The HP shaft 26 is conventionally rotatably supported to the LP shaft 24 by a plurality of conventional bearings 40, two of which are shown.

The engine 10 further includes a conventional inlet 42 for receiving ambient airflow 44 which is channeled into the booster compressor 12 wherein it is initially compressed and generates a forwardly directed axial force $F_1$. The compressed airflow 44 then flows through the front frame 28 and then through the HPC 14 wherein it is additionally compressed. The airflow 44 so compressed is indicated in FIG. 1 by the dashed arrows 46. The compressed airflow 46 is mixed in the combustor 16 with fuel from a conventional fuel injector means 48 for generating hot combustion gases 50 which are channeled through the HPT 18 and the LPT 20 wherein energy is extracted therefrom for powering the HPC 14 and the booster compressor 12, respectively. Since the pressure of the gases 50 decreases through the LPT 20, an aft directed axial force $F_2$ is generated. The LPT 20 also provides shaft power to the electrical generator 38. The combustion gases 50 are then channeled through the rear frame 34 and into a conventional industrial exhaust assembly 52 from which the gases 50 are discharged to the atmosphere.

In accordance with one embodiment of the present invention, the engine 10 further includes an annular balance rotor or piston 54 disposed downstream of the TRF 34 and conventionally fixedly joined to the LP shaft 24 for rotation therewith. Means 56 are provided for channeling a fluid first to the balance piston 54 for balancing thrust force on the LP shaft 24 from the booster compressor 12 (i.e. $F_1$) and the LPT 20 (i.e. $F_2$) by generating an axial thrust balance force $F_b$ on the LP shaft 24; and then to the TRF 34 for heating thereof. As described above, the LPT 20 generates a relatively large axial force $F_2$, substantially greater than the axial force $F_1$ from the booster 12. The means 56 are effective for generating the balance force $F_b$ which is about equal to the difference of $F_2-F_1$. In the preferred embodiment, the fluid preferably comprises a bleed portion 46a of the compressed airflow 46 which is bled from the HPC 14 through a conventional bleed means 58 at an intermediate stage thereof and channeled through a bleed conduit 60 through a valve 62 used in the preferred imbodiment for controlling net force with differing seal clearances to the TRF 34 as described in more particularity below.

Figure 8:
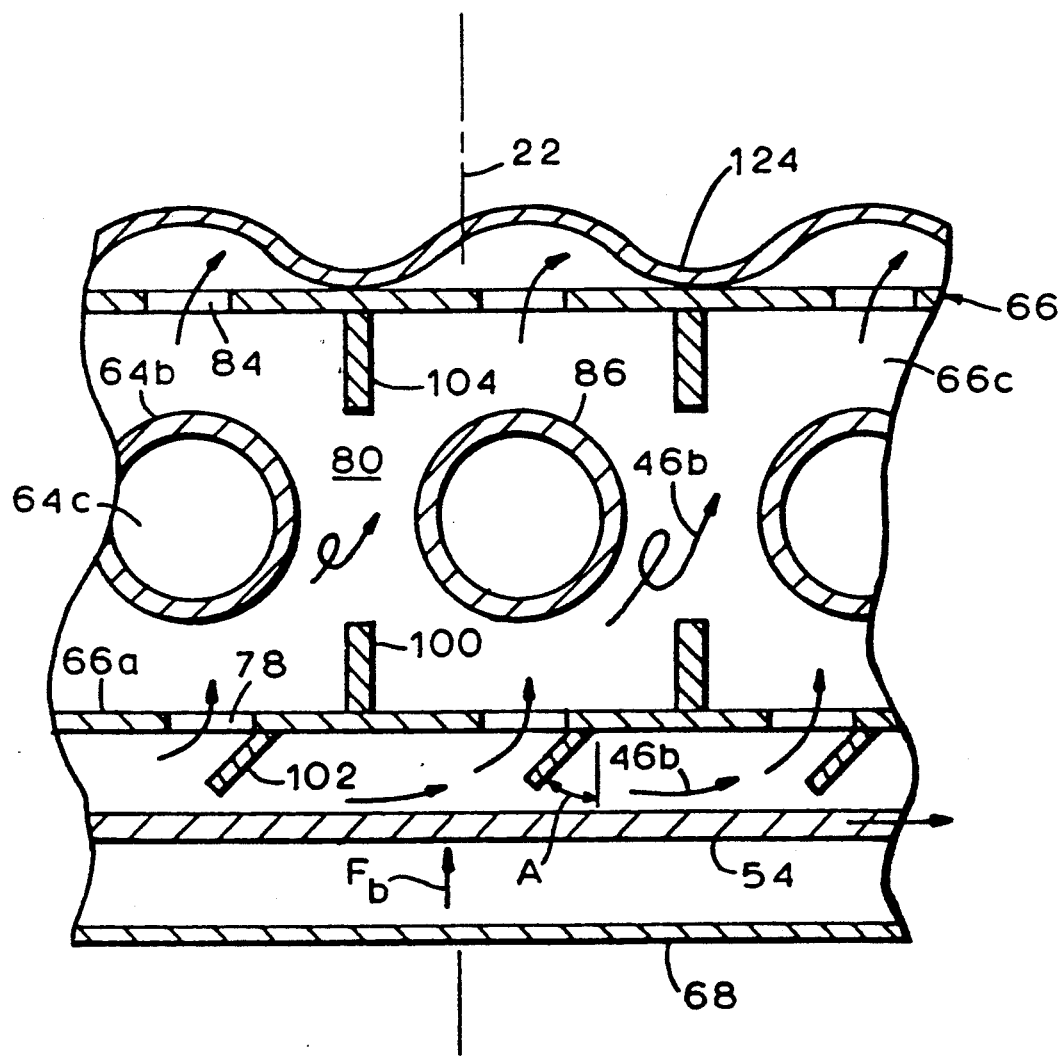
FIG. 8 is a radial sectional view of another portion of the turbine rear frame hub, balance piston and stator illustrated in FIG. 3 taken along line 8—8.

As shown generally in FIG. 1, the TRF 34 includes a plurality of circumferentially spaced radially extending hollow struts 64 between which struts 64 the combustion gases 50 are flowable. The struts 64 are fixedly secured to an annular hollow hub 66 of the TRF 34 which conventionally supports the bearing 36 and the intermediate portion of the LP shaft 24. As shown in dashed line in FIG. 5 some of the struts 64 extend through the hub 66 for conventionally providing access to the interior of the engine for oil supply pipes, for example, (not shown). As shown in FIG. 8, these access struts 64 transition to a generally circular end portion 64b inside the hub 66 and include an outlet 64c through an inner wall 66c of the hub 66 for the oil supply pipes. The strut end portion 64b is conventionally sealed to the hub inner wall 66c to prevent flow communication between the inside of the strut 64 and the inside of the hub 66.

In accordance with the present invention, a method is disclosed for channeling the bleed air 46a first to the balance piston 54 for balancing thrust force on the LP shaft 24 by generating the thrust balance force $F_b$ on the LP shaft 24, and then channeling the bleed air 46a used firstly for the thrust balancing step to the TRF 34 for heating the frame hub 66. Since the struts 64 are subject to the relatively hot combustion gases 50, they heat and expand relatively quickly. On the other hand, the hub 66 is not directly exposed to the combustion gases 50, and the channeling means 56 in accordance with the present invention is thereby effective for channeling the relatively hot bleed air 46a to the hub 66 for heating the hub 66 to a temperature generally equal to the temperature of the struts 64 for reducing temperature differentials therebetween.

In the preferred embodiment, the bleed air 46a is provided to the balance piston 54 at a first temperature $T_1$ and a first, static, pressure $P_1$ as a balancing fluid also designated herein as 46a since it is the same fluid as the bleed air 46a received from the HPC 14. In this exemplary embodiment, the combustion gases 50 at the TRF 34 have a second temperature $T_2$ of about 750° F. about 400° C.) and a second, static, pressure $P_2$ of about one atmosphere. In order to heat the hub 66 to the temperature $T_2$ experienced by the struts 64, the temperature $T_1$ of the bleed air 46a should be about equal to the temperature $T_2$ of the combustion gases 50 at the TRF 34.

Figure 2:
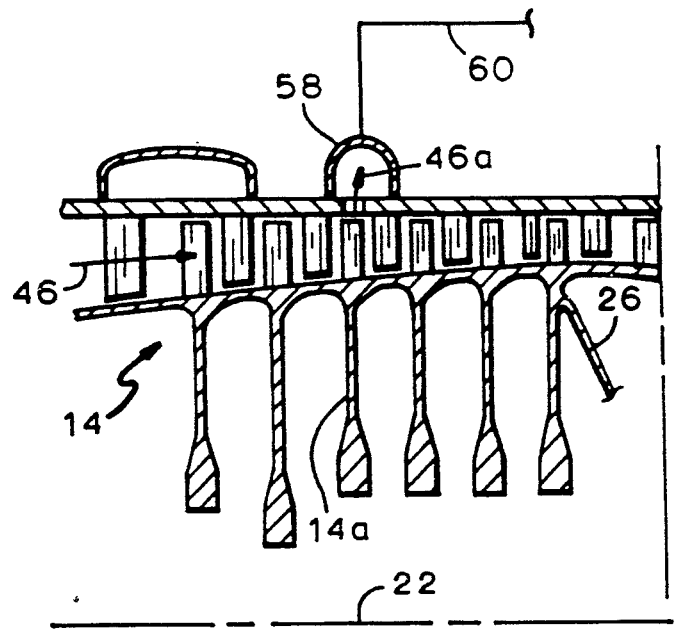
FIG. 2 is an enlarged longitudinal sectional view of a portion of a high pressure compressor of the engine illustrated in FIG. 1.

Accordingly, it is preferred to select an appropriate stage of the HPC 14 having a temperature $T_1$ which is generally equal to the temperature $T_2$. In the particular exemplary embodiment illustrated, the HPC 14 has available from the original aircraft gas turbine engine, four conventional bleeds from which to select. The various bleeds provide bleed air at various pressures and temperatures, and the bleed means 58 comprises, in this exemplary embodiment, an eleventh stage bleed of the HPC 14 having a temperature $T_1$ of about 750° F. (about 400° C.) and a nominal pressure $P_1$ of about fourteen atmospheres. FIG. 2 illustrates a portion of the HPC 14 which is a conventional compressor having a plurality of rotor blades and stator vanes with the eleventh stage being indicated by reference numeral 14a. The bleed means 58 includes a conventional annular manifold which receives the bleed air 46a and channels it through the bleed conduit 60.

Figure 3:
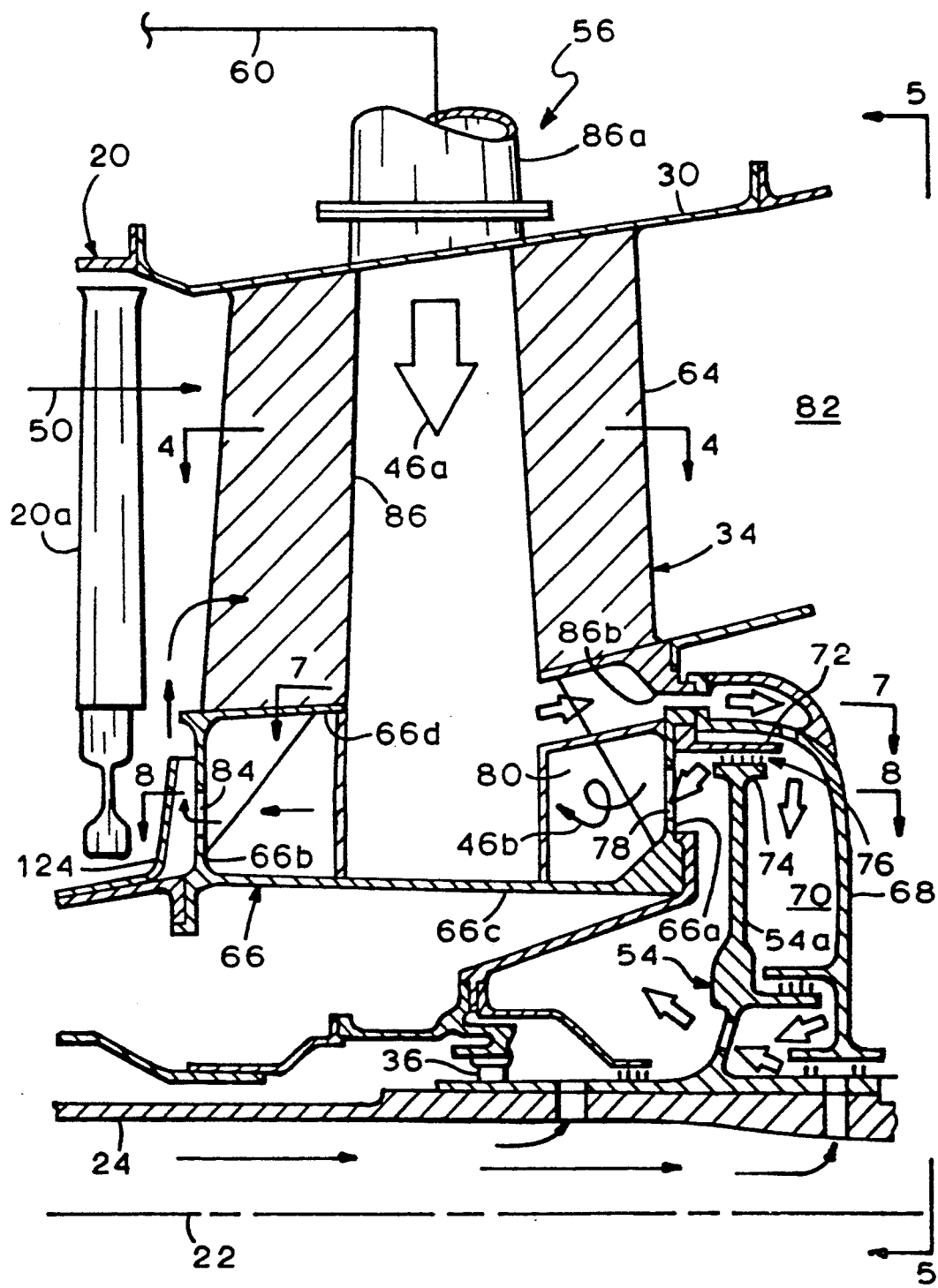
FIG. 3 is an enlarged longitudinal sectional view of the turbine rear frame and balance piston assembly illustrated in FIG. 1.

FIG. 3 illustrates in more particularity the fluid channeling means 56. Disclosed also is a last rotor stage 20a of the LPT 20 from which the combustion gases 50 are provided to the TRF 34 at the second temperature $T_2$ and the second pressure $P_2$. The fluid channeling means 56 includes an annular balance stator 68 space axially aft from the aft surface 54a of the balance piston 54 to define a balance plenum 70 for first receiving the bleed air 46a as the balancing fluid 46a at the first temperature $T_1$ and the first pressure $P_1$. An annular first seal stator 72 extends rearwardly from the aft surface 66a of the hub 66 to a radially outer perimeter 74 of the balance piston 54 to define a first seal 76 having a predetermined radial clearance for channeling a first portion of the balancing fluid 46a therethrough as a heating fluid designated 46b. In other words, once the balancing fluid 46a passes through the first seal 76 and loses pressure as described hereinbelow, it becomes the heating fluid 46b since it remains relatively hot at this point prior to entering the hub 66.

A plurality of hub inlets 78, in the form of relatively large holes, are disposed in the hub aft wall 66a and spaced circumferentially therearound. The hub inlets 78 are also spaced axially from the first seal 76 for channeling therethrough the heating fluid 46b into the hub 66. The hub 66 includes an annular hub cavity 80 defined between the hub aft wall 66a, a hub forward wall 66b, the hub inner wall 66c, and a hub outer wall 66d. The hub outer wall 66d also defines an annular inner flowpath wall. The inner flowpath wall 66d is spaced radially inwardly from an outer flowpath wall defined by the outer casing 30 to define an annular flowpath 82 for channeling the combustion gases 50 received from the LPT 20. A plurality of hub outlets 84 is disposed in the hub forward wall 66b for discharging the heating fluid 46b from the hub cavity 80.

In the preferred embodiment, the bleed air 46a is channeled to the balance plenum 70 through the frame struts 64. More specifically, at least one of the struts 64, and in the preferred embodiment two of the struts 64 spaced 180° apart, includes a conduit 86 extending therethrough, having an inlet 86a disposed in flow communication with the bleed conduit 60 for receiving the bleed air 46a. Each of the conduits 86 also includes an outlet 86b disposed in flow communication with the balance plenum 70 as further described hereinbelow.

Figure 4:
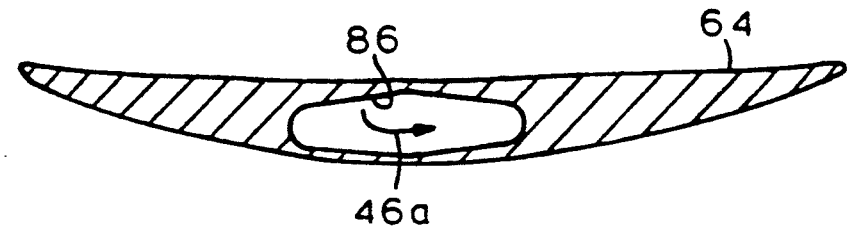
FIG. 4 is a radial sectional view of one of the turbine frame struts illustrated in FIG. 3 taken along line 4—4.

FIG. 4 illustrates in more particularity a sectional view through one of the struts 64. The strut 64 includes therein the conduit 86 which has an elongate section generally similar to the airfoil shaped section of the struts 64.

Figure 5:
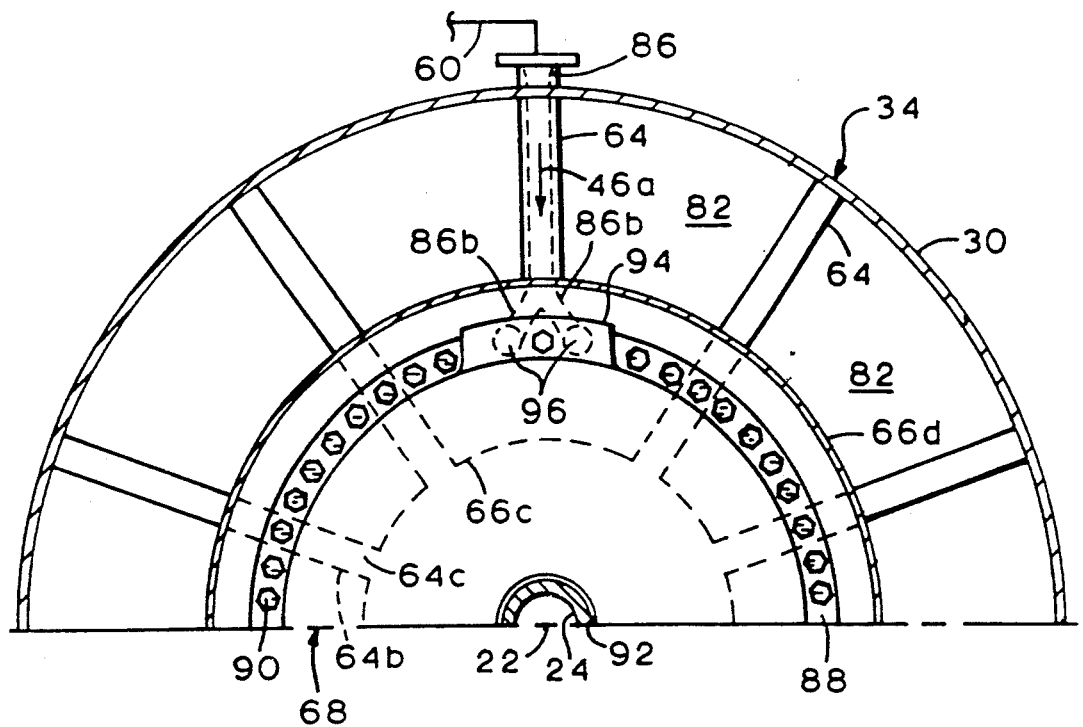
FIG. 5 is an m facing end view of half of the turbine rear frame and balance stator illustrated in FIG. 3 taken along line 5—5.

FIG. 5 illustrates an upstream facing view of the TRF 34 and the balance stator 68. The balance stator 68 includes a radially outer end, or radial flange 88 which is fixedly connected to the hub aft wall 66a by a plurality of circumferentially spaced conventional bolts 90. Since the balance stator 68 must accommodate the reaction axial balance thrust forces imposed against balance piston 54, an appropriate number of the bolts 90 are provided for suitably transferring the load to the hub 66. The stator 68 also includes a radially inner end 92 which is disposed coaxially with and adjacent to the LP shaft 24 for allowing the shaft 24 to extend rearwardly through the balance stator 68 to the electrical generator 38.

Figure 6:
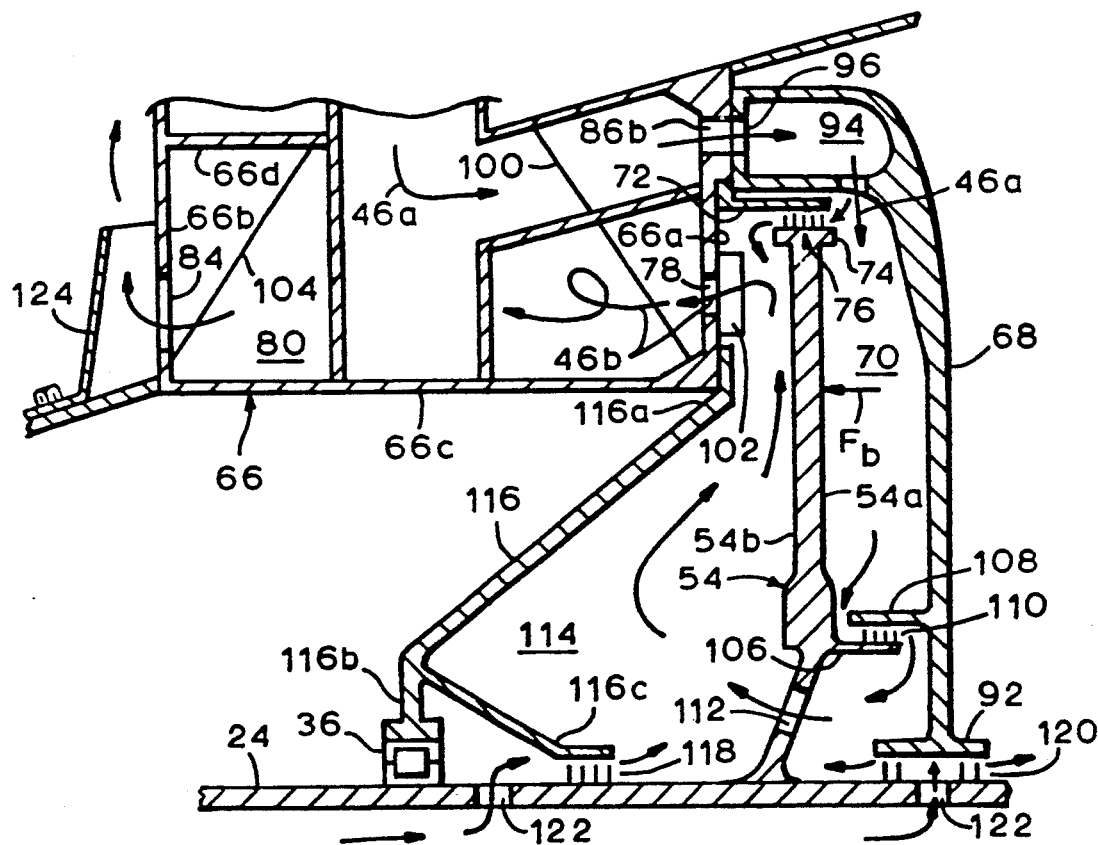
FIG. 6 is an enlarged longitudinal sectional view of a portion of the turbine rear frame hub and balance piston assembly illustrated in FIG. 3.
Figure 7:
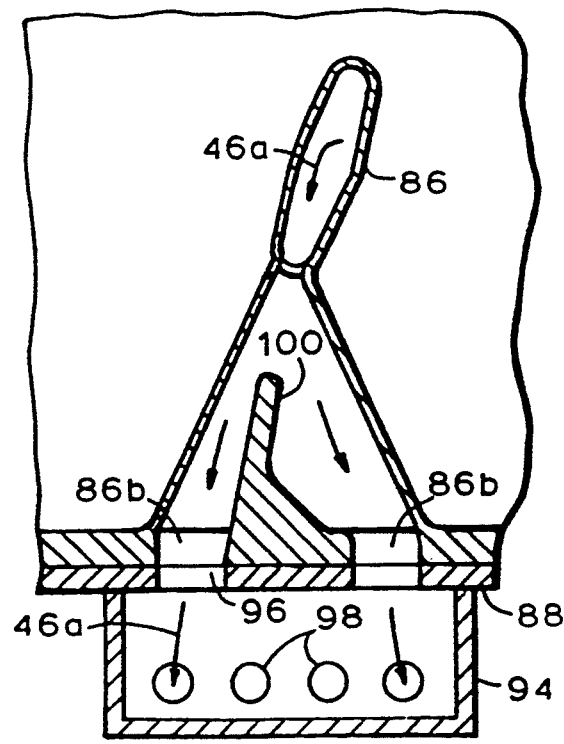
FIG. 7 is a radial sectional view through a portion of the turbine rear frame hub and balance stator illustrated in FIG. 3 taken along line 7—7.

Referring also to FIG. 6, the balance stator 68 also includes two identical inlet plenums 94 spaced 180° apart (only one being shown) with each associated with a respective one of the conduits 86. The inlet plenum 94 is disposed at the radially outer end 88 of the stator 68 and includes an inlet 96 for first receiving the bleed air 46a from the conduit 86. A plurality of circumferentially spaced transfer ports 98 provides a discharge from the inlet plenum 94 for channeling the balancing fluid 46a into the balance plenum 70. FIG. 7 illustrates in more particularity a top sectional view of the inlet plenum 94 illustrating the transfer ports 98, the inlets 96, the conduit 86, and conduit outlets 86b disposed in flow communication with the inlets 96 of the inlet plenum 94.

In the preferred embodiment, as illustrated for example in FIGS. 6–7, a plurality of circumferentially spaced aft stiffening webs 100 joins the hub aft wall 66a to the outer wall 66d for providing an effective reaction load path for the balance forces transmitted through the balance stator 68 to the hub 66.

The conduit 86, the conduit outlets 86b, the inlet plenum 94, the inlet plenum inlets 96 and transfer ports 98 are all predeterminedly sized for providing relatively low pressure drop of the bleed air 46a channeled to the balance plenum 70. This may be accomplished by sizing these components as large as practical for reducing pressure losses therein. In this regard, the outlet 86b of the conduit 86 is in the form of a pair of outlets 86b disposed on both sides of one of the webs 100 for providing a combined total flow area which is relatively large for providing reduced pressure losses therefrom.

Another feature of the method in accordance with the present invention includes accelerating the balancing fluid 46a between the balance piston 54 and the hub 66 for obtaining the heating fluid 46b which is channeled through the hub cavity 80 for heating the hub 66 as illustrated in FIG. 6. More specifically, the accelerating step includes reducing the pressure of the balancing fluid 46a to the second pressure $P_2$ which is less than the first pressure $P_1$ and forming a jet of the heating fluid 46b from the first seal 76. One means for accomplishing the acceleration of the balancing fluid 46a is to predeterminedly size the first seal 76 so that the first seal clearance is effective for channeling a predetermined first portion of the balancing fluid 46a from the balance plenum 70 to the hub cavity 80. The clearance is selected for providing a suitable amount of the heating fluid 46b to the cavity 80 for effectively heating the hub 66.

Heating of the hub 66 is proportional to the heating ability of the heating fluid 46b which is in turn proportional to the temperature of the heating fluid 46b and its ability to transfer heat into the hub 66. By predeterminedly sizing the first seal 76 for obtaining the jet of heating fluid 46b, the velocity of the heating fluid 46b is increase along with its turbulence which are both effective for increasing the heat transfer, and therefore the heating ability of the heating fluid 46b. Furthermore, by channeling the balancing fluid 46a through the first seal 76 disposed at the outer perimeter 74 of the balance piston 54, rotation of the balance piston 64 with the LP shaft 24 further accelerates the heating fluid 46b by circumferentially or tangentially frictionally accelerating the balancing fluid first portion channeled to the first seal 76 for swirling the heating fluid 46b. Swirling of the heating fluid 46b increases its turbulence and ability to transfer heat into the hub 66.

The circumferentially swirled heating fluid 46b is illustrated in more particularity in FIG. 8 showing a top sectional view through the balance piston 54 and the hub cavity 80. The heating fluid 46b discharged from the first seal 76 flows generally in a tangential direction relative to the balance piston 54 and, accordingly, a plurality of deflectors 102 is preferably provided for extending from the hub aft wall 66a adjacent to respective ones of the hub inlets 78. Each deflector 102 is disposed at an acute angle A relative to the axial centerline axis 22 of the engine 10 for channeling the heating fluid 46b through the hub inlets 78 for additionally swirling the heating fluid 46b into the hub cavity 80. FIG. 8 also illustrates a plurality of circumferentially spaced forward stiffening webs 104 for providing additional stiffening to the hub 66 for accommodating the reaction axial loads transferred from the balance stator 68.

Referring again to FIG. 6, the balance piston 54 further includes an intermediate portion 106 spaced radially inwardly of the perimeter 74, and the balance stator 68 includes an annular second seal stator 108 extending axially forwardly therefrom to the balance piston intermediate portion 106 to define a second seal 110 for sealing the balancing fluid 46a in the balance plenum 70. The balance piston aft side 54a between the perimeter 74 and the intermediate portion 106 is predeterminedly sized for having an area against which acts the pressure $P_1$ of the balancing fluid 46a. In the exemplary embodiment, the pressure $P_1$ is nominally about fourteen atmospheres which acts against the effective pressure area of the balance piston aft side 54a is effective for generating up to about 70,000 lbs. (about 32,000 kilograms) thrust balancing force $F_b$.

In one embodiment, all of the heating fluid 46b may be provided to the hub cavity 80 through the first seal 76, or, in an alternate embodiment, a portion of the heating fluid 46b may be provided by suitably channeling preselected leakage flow from the second seal 110 to the hub inlet 78.

More specifically, the second seal 110 has a predetermined clearance for channeling a second portion of the balancing fluid 46a therethrough. A plurality of circumferentially spaced transfer holes 112 extends through a radially inner end of the balance piston 54 for channeling the balancing fluid second portion into a sealed cavity 114 disposed in flow communication with the hub inlet 78 for joining with the balancing fluid first portion channeled through the first seal 76 for forming the heating fluid 46b channeled into the hub cavity 80.

In the preferred embodiment, an annular wall member, or bearing support, 116 has a radially outer end 116a conventionally fixedly connected to the hub aft wall 66a, and also includes an inner end 116b which supports the bearing 36. The wall member 116 also includes a third seal stator 116c disposed adjacent to the LP shaft 24 to define a third seal 118. The wall member 116 is axially spaced forwardly from a forward side 54b of the balance piston 54 to define the annular sealed cavity 114.

The sealed cavity 114 is predeterminedly sized for allowing expansion of the balancing fluid first and second portions channeled from the first seal 76 and the second seal 110. And, the clearance in the second seal 110 is effective for reducing pressure of the balancing fluid second portion to the second pressure $P_2$ and also accelerating the balancing fluid second portion into the sealed cavity 114 through the transfer holes 112. In the preferred embodiment, the wall member 116 and the balance piston 54 converge radially outwardly with each other so that the sealed cavity 114 converges radially outwardly along the balance piston 54. This is effective for accelerating radially outwardly the balancing fluid second portion channeled through the transfer holes 112 and swirling circumferentially that second portion by the forward wall 54b of the balance piston 54.

More specifically, as the balancing fluid second portion is channeled radially upwardly along the forward wall 54b, the rotating balance piston 54 is effective for radially accelerating and circumferentially swirling the balancing fluid second portion by friction therewith. This is additionally effective for providing the heating fluid 46b with increased turbulence and swirl for increasing the heat transfer into the hub 66.

In the preferred embodiment, the balance stator inner end 92 defines with the LP shaft 24 a fourth seal 120 for preventing the balancing fluid second portion from escaping therefrom. The balancing fluid 46a is relatively hot and it is preferred to contain the fluid inside the balance stator 68 so that other means are not required for suitably containing the hot fluid, for operator safety reasons for example.

The first, second, third, and fourth seals 76, 110, 118, and 120, respectively, are conventional seals such as for example labyrinth seals. And, the third and fourth seals 118 and 120 are preferably pressurized seals for ensuring that none of the balancing fluid 46a escapes from the cavity 114 or past the balance stator 68 in the aft direction. These seals may be suitably and conventionally pressurized by providing suitable compressed airflow from one of the compressors through the LP shaft 24 and through respective apertures 122 at a suitable pressure greater than the pressure of the balancing fluid in the sealed cavity 114.

Referring again to FIG. 3, 6, and 8, an annular, radial deflector 124 is suitably fixedly connected, by bolts for example, to the forward side of the hub forward wall 66b for channeling radially outwardly the heating fluid 46b discharged through the hub outlets 84 and into the flowpath 82 between adjacent struts 64 whereby any remaining energy therein is returned to mix with the combustion gases 50. The deflector 124 is preferably circumferentially sinusoidal for increasing the rigidity thereof for increasing its natural frequency.

A significant advantage of the present invention, is the dual use of the compressor bleed air 46a firstly for providing thrust balancing and secondly for heating the turbine rear frame hub 66. The relatively high pressure $P_1$ of the bleed air 46a is effectively used first for providing thrust balancing and is then converted into increased velocity and turbulence of the heating fluid 46b for providing improved heat transfer, and therefore heating, of the hub 66. The bleed air 46a is selected to have the temperature $T_1$ which is generally equal to the temperature $T_2$ experienced by the struts 64 to ensure that the hub 66 is heated to generally the same temperature as the struts 64. The arrangement described above is effective for providing relatively fast transient heating of the hub 66 to closely follow the heating of the struts 64 by the increased heat transfer capability of the accelerated and swirled air 46b. Friction with the balancing fluid 46a by the rotating perimeter 74 and forward side 54b is effective for circumferentially swirling and accelerating the balancing fluid. The swirled heating fluid 46b therefore takes a relatively longer flowpath through the hub cavity 80 for improved heat transfer therein.

Additional advantages of the present invention include the first and second seals 76 and 110 which do not require highly efficient flow blockage, since they are intended to provide a suitable amount of the heating fluid 46b to the hub cavity 80. Since the heating fluid 46b is provided at a substantially reduced pressure due to expansion of the balancing fluid in the expansion cavity 114 with a substantially large pressure drop across the first and second seal 76 and 110, relatively low pressure heating fluid 46b is provided in the hub cavity 80. Accordingly, the hub 66 does not required additional stiffening for accommodating the relatively high pressure of the bleed air 46a which would otherwise be required if the bleed air 46a were provided directly in the hub cavity 80.

Furthermore, the relatively large hub inlets 78 and outlets 84 allow the hub 66 to be manufactured by the investment casting process for reducing cost.

Yet further, the valve 62 may be used to modulate the amount of bleed air 46a channeled to the balance plenum 70 and the hub 66 and thereby tailor the amount of thrust balancing and heating of the hub 66.

Although the balance piston 54 is disclosed in the preferred embodiment aft of the turbine rear frame 34, it may also be positioned forward of the turbine rear frame 34. The present invention may also be practiced on other types of rear frames wherein the dual use of a fluid may be used for both providing thrust balance and heating, or cooling, as appropriate, of a turbine frame.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters patent of the United States is the invention as defined and differentiated in the following claims.

We claim:

1. For a gas turbine engine comprising a turbine rear frame having a hub for rotatably supporting a shaft and a balance piston fixedly joined to said shaft, a method comprising:
    channeling a fluid first to said balance piston for balancing thrust force on said shaft by generating a thrust balance force on said shaft; and
    channeling said fluid used firstly for said thrust balancing step to said rear frame for heating said frame hub.

2. A thrust balancing and frame heating method according to claim 1 further including:
    providing said fluid to said balance piston at a first temperature and a first pressure as a balancing fluid;
    accelerating said balancing fluid between said balance piston and said hub for obtaining a heating fluid; and
    channeling said heating fluid through said hub for heating said hub.

3. A thrust balancing and frame heating method according to claim 2 wherein said accelerating step comprises reducing pressure of said balancing fluid to a second pressure less than said first pressure and forming a jet of said heating fluid.

4. A thrust balancing and frame heating method according to claim 3 wherein said accelerating step further comprises swirling said heating fluid.

* * * * *